US011442995B2

(12) United States Patent
Lehmann et al.

(10) Patent No.: US 11,442,995 B2
(45) Date of Patent: Sep. 13, 2022

(54) FILTERING OF LOG SEARCH RESULTS BASED ON AUTOMATED ANALYSIS

(71) Applicant: ServiceNow, Inc., Santa Clara, CA (US)

(72) Inventors: Yaron Lehmann, Tel Aviv (IL); Dror Mann, New York, NY (US); Gabby Menahem, Santa Clara, CA (US); Orr Semmel, Herzelia (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/076,674

(22) Filed: Oct. 21, 2020

(65) Prior Publication Data

US 2022/0121709 A1    Apr. 21, 2022

(51) Int. Cl.
*G06F 16/00* (2019.01)
*G06F 16/9035* (2019.01)
*G06F 16/25* (2019.01)
*G06F 16/248* (2019.01)

(52) U.S. Cl.
CPC ........ *G06F 16/9035* (2019.01); *G06F 16/248* (2019.01); *G06F 16/25* (2019.01)

(58) Field of Classification Search
CPC ..... G06F 16/9035; G06F 16/25; G06F 16/248
USPC .................................................. 707/600–899
See application file for complete search history.

(56) References Cited

U.S. PATENT DOCUMENTS

| | | | | |
|---|---|---|---|---|
| 8,413,250 | B1* | 4/2013 | Krynski | H04L 43/04 |
| | | | | 726/26 |
| 10,303,797 | B1* | 5/2019 | Menezes | G06F 16/137 |
| 2012/0203660 | A1* | 8/2012 | Moritz | G06Q 30/02 |
| | | | | 705/26.7 |
| 2016/0099898 | A1* | 4/2016 | Watanabe | H04L 41/0604 |
| | | | | 709/204 |
| 2016/0371132 | A1* | 12/2016 | Prabhakara | G06F 11/0709 |
| 2019/0108112 | A1* | 4/2019 | Kannan | G06F 17/40 |
| 2021/0397499 | A1* | 12/2021 | Pronk | G06F 11/0775 |

* cited by examiner

*Primary Examiner* — Michelle N Owyang
(74) *Attorney, Agent, or Firm* — Van Pelt, Yi & James LLP (57) ABSTRACT

A request to explore a set of log entries is received. The set of log entries are analyzed to identify common portions in contents of at least a portion of the set of log entries. Based on the analysis that identified the common portions, filters to explore the set of log entries are automatically recommended.

20 Claims, 6 Drawing Sheets

FILTERING OF LOG SEARCH RESULTS BASED ON AUTOMATED ANALYSIS

BACKGROUND OF THE INVENTION

Software services can typically be configured to generate logging data. This data can be generated during a variety of scenarios including during the initialization step of a software service, during the steady-state operation of a service, on error handling, and/or while performing routine or uncommon software service sub-tasks, among others. The logging data can contain state information, timing and/or date information, as well as a variety of messages including error and/or informational messages. For example, logging data for a software service can contain log entries where each entry includes a timestamp and information related to and corresponding to the state of the software service or a component of the service at the moment of the timestamp. Depending on the frequency and verbosity of the logging configuration, it is not uncommon for a service to generate multiple logs where each log can include hundreds of log entries (or more) with multiple entries generated per second. While voluminous, this data can be critical for understanding the behavior of the software service and its sub-components. For example, administrators, technology support staff, customers, and others may examine generated log files to identify usage patterns, confirm functioning behavior, isolate and identify non-functioning behavior, and/or track performance and resource usage, among other purposes.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An automatic analysis technique for searching log entries is disclosed. Using the disclosed techniques, log entries can be quickly and efficiently searched using automatically recommended and indexed search filters. Log entries are first analyzed for common portions of words and/or phrases. In some embodiments, the log entries are analyzed using one or more machine learning techniques including natural language processing techniques. The identified common portions may exist in the log entries with differing frequency. For example, an identified common portion may be repeated with high frequency throughout the log entries or may be a rare or unique occurrence in the log entries. The frequency and/or distribution of a common portion can be tracked and used for ordering and/or surfacing recommendations.

In various embodiments, the identified common portions of log entries are indexed. The indexing allows for efficient and quick lookups of any of the common portions within log entries. In some embodiments, the index is implemented by assigning each common portion a unique identifier such as a unique numeric identifier. Once the common portions are identified and indexed, recommended search filters of the common portions are determined. The recommended search filters can be used to quickly search log entries to identify a narrow set of relevant log entries among hundreds, thousands, or more log entries. For example, a simple or complex query can be constructed by selecting one or more recommended search filters. Operators including filter-in and/or filter-out operators can be utilized to configure a search query. For example, a filter-in operator results in matches to log entries that include a selected common portion while a filter-out operator only matches log entries that do not include the selected common portion. Various complex queries including regular expressions can be constructed using the recommended filters. In some embodiments, the queries are constructed using a query language built on the recommended filters and query operators.

In some embodiments, the recommended filters are displayed along with a portion of the log entries. For example, the identified common portions (such as words and phrases) associated with the recommended filters can be highlighted where and when they appear in the displayed log entries. Users can interact with the highlighted recommended filters, for example, to display a corresponding frequency metric and/or to select the recommended filter for filtering. In some embodiments, the user interface displays detailed options such as filter-in and/or filter-out operations to apply to a search query using the recommended filter. For example, a user can hover over a common portion identified in a log entry as a recommended filter and select a filter-in operator that creates a search query. The corresponding search query matches to only log entries that include the common portion.

In various embodiments, the recommended filters can be used for searching log entries by incorporating the filters in additional or alternative user interface components. For example, a user interface component such as a side panel can display one or more recommended filters. The filters can be displayed by showing the common portion and optionally a corresponding frequency metric and filtering operators. In some embodiments, the filters are also displayed in a sorted order, such as sorted by frequency metric. For example, the recommended filters can display the most common and most unique common portions. Users can select from the recommended filters to apply a corresponding search query. The search queries are applied to the log entries to narrow down the entries for a filtered set of log entries. The narrowing of log entries using the recommended filters is possible using a variety of different user interface embodiments that incorporate the recommended filters. By automatically identifying and indexing log entries by common portions, the provided recommended filters based on the common portions allow a user to quickly and efficiently narrow down the log data to a small set of relevant log entries. Users, such as administrators, technology support staff, customers, and others, can quickly identify the relevant log entries to identify usage patterns, confirm functioning behavior, isolate and identify non-functioning behavior, and/or track performance and resource usage, among other purposes. In some embodiments, as new log entries are generated, they are automatically analyzed and indexed. The recommended filters can be updated to reflect the current state of the logging data.

In some embodiments, logging data is generated by a software service. For example, a cloud service generates logging data that includes multiple log entries. A request to explore a set of log entries is received. For example, a user submits a request to narrow down the logging data. The request may be directed to a portion or set of log entries of the logging data, such as only log entries associated with a specific time span or one or more software components/modules. In some embodiments, the set of log entries are analyzed to identify common portions in contents of the at least a portion of the set of log entries. For example, the log entries are analyzed to identify common words and/or phrases found in a subset of the log entries. The common portions may appear frequently or infrequently and can represent common portions of words/phrases within log entries that range from being often repeated words/phrases to extremely unique ones. Based on the analysis that identified the common portions, filters to explore the set of log entries are automatically recommended. For example, common phrases ranging from the most frequently occurring to the least frequently occurring phrases are identified for use as filters to narrow down the set of log entries for further review. In some embodiments, the most frequent common phrases may be identified and used as recommendation filters and/or the least frequent common phrases may be identified and used as recommendation filters. In various embodiments, the identified common phrases can be sorted by and/or include a corresponding frequency metric such as an associated distribution metric of the identified common phrase among the analyzed log entries of the logging data. The common phrases can be selected and utilized to narrow down the relevant log entries. In various embodiments, one or more selected common portions can be used to filter-in and/or filter-out the log entries. For example, the filtered log entries can be required to include a selected common portion (filter-in) or be required to not include the selected common portion (filter-out). In some embodiments, some common portions are selected and used to filter-in while others are selected and used to filter-out the log entries. In various embodiments, a search query can be constructed to filter the log entries. The query can be a complex query that utilizes multiple operations, such as regular expression operations, involving multiple identified common portions. In some embodiments, the query utilizes a query language with common portions as operands.

Figure 1:
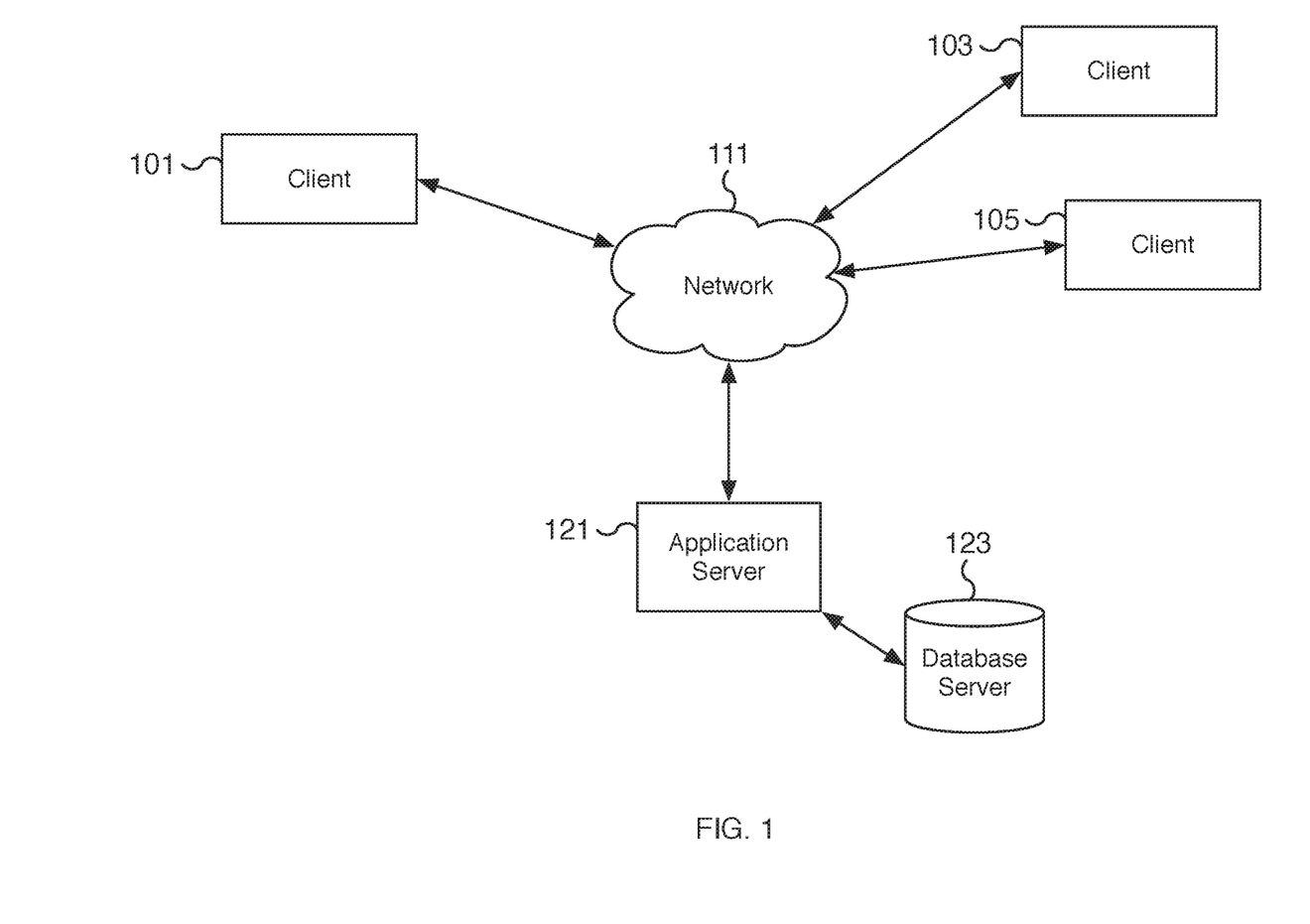
FIG. 1 is a block diagram illustrating an example of a cloud service network environment for analyzing log search results.

FIG. 1 is a block diagram illustrating an example of a cloud service network environment for analyzing log search results. In the example shown, the log search results can be filtered for examination based at least in part on the automated analysis of logging data to identify and index common portions of log entries. The identified common portions can be words and/or phrases of words that appear within the log entries. In various embodiments, the distribution of the identified common portions in the log entries can vary from occurring repeatedly with a high frequency to occurring rarely with a very low frequency. Some common portions may exist only in a single log entry while others may exist in nearly all log entries. In the example shown, clients 101, 103, and 105 access cloud-based services hosted by application server 121 via network 111. Network 111 can be a public or private network. In some embodiments, network 111 is a public network such as the Internet. In various embodiments, clients 101, 103, and 105 are network clients such as web browsers for accessing web services such as web-based configuration management database (CMDB) services and log analysis services. Application server 121 utilizes database server 123 for storing and retrieving data. For example, data is written to and retrieved from database server 123. In some embodiments, database server 123 is a relational database such as a MySQL database. In various embodiments, database server 123 is used to store log entries corresponding to logging data generated by the cloud services hosted by application server 121. Clients 101, 103, and/or 105 can then be used to explore the contents of the generated logs using recommended filters based on identified common portions within the log entries.

In some embodiments, cloud-based services can be implemented by pairing application server 121 and database server 123. Application server 121 can utilize database server 123 to provide certain services. For example, database server 123 can function as a configuration management database (CMDB) used by application server 121 for providing CMDB services. The provided services, such as CMDB services, can generate logging data across multiple different logs and different service components. For example, cloud services can generate log entries specific to different software/hardware components such as a network component, a database component, and a security component, among others. As another example, cloud services can generate log entries based on different events and/or actions such as a user login attempt event, a particular notification/messaging event, a resource assignment event, and a hardware exception event, among others. The logging data can be stored at database server 123 and/or another data store. Among other information, database server 123 can store configuration information related to managed assets, such as related hardware and/or software configurations. In some embodiments, database server 123 is a persistent computer storage that is network accessible and used to store and query customer data. In various embodiments, database server 123 can be utilized to store customer information for one or more different customers.

In some embodiments, application server 121 includes not only cloud service logic for performing cloud services but also a log analysis logic for analyzing log entries. The log analysis logic may be implemented as a log analysis engine and can identify common portions of log entries. The identified portions are indexed to allow for quick and efficient lookups of common portions in reference to the corresponding log entries. In some embodiments, the index is stored on storage of application server 121 or another appropriate data store. In various embodiments, the common portions are utilized to form recommended filters that are provided via the cloud services of application server 121. The recommended filters can be used to explore the log entries, for example, by performing a search filter. The search filter may include Boolean operations on the recommended filters including filter-in and filter-out operations. In some embodiments, a filter-in operation corresponds to a Boolean AND operation and a filter-out operation corresponds to a Boolean AND NOT operation. In various embodiments, the recommended filters can be presented to a client, such as one of clients 101, 103, or 105, via a user interface, such as a web user interface, using a variety of user interface techniques and in more than one form for ease of exploration.

In some embodiments, application server 121 and/or database server 123 are hosted on a hardware cloud instance. Although single instances of some components have been shown to simplify the diagram, additional instances of any of the components shown in FIG. 1 may exist. For example, application server 121 may include one or more servers. Similarly, database server 123 may include one or more database servers and may not be directly connected to application server 121. For example, database server 123 and its components may be replicated and/or distributed across multiple servers and/or components. In some embodiments, components not shown in FIG. 1 may also exist.

Figure 2:
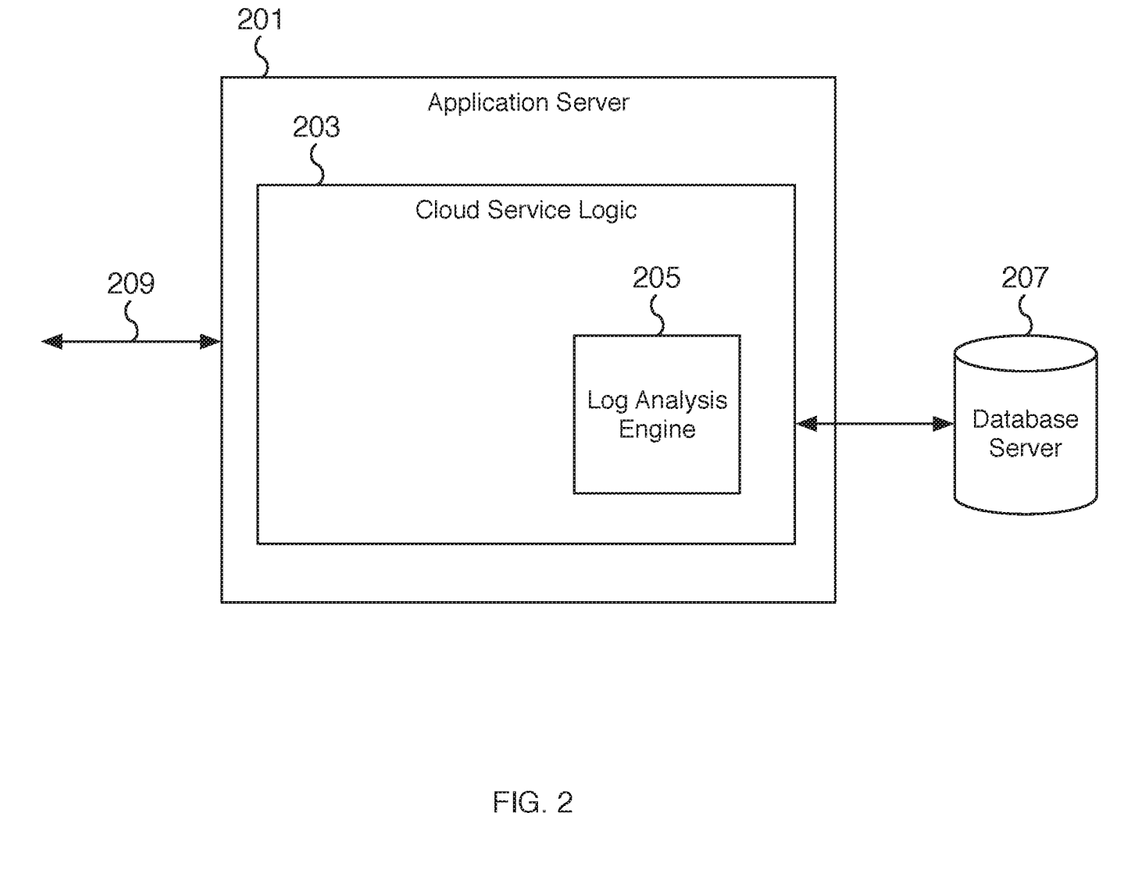
FIG. 2 is a block diagram illustrating an example of an application server for analyzing log search results.

FIG. 2 is a block diagram illustrating an example of an application server for analyzing log search results. In the example shown, application server 201 includes cloud service logic 203 and log analysis engine 205. Application server 201 is communicatively connected to database server 207. Application server 201 is connected to a network via network connection 209. In various embodiments, application server 201 provides cloud services implemented by cloud service logic 203 over network connection 209 including services such as configuration management database (CMDB) services and/or log analysis services. In the example shown, cloud service logic 203 is a cloud services application layer that runs on application server 201 and includes log analysis engine 205. In some embodiments, application server 201 is application server 121 of FIG. 1 and database server 207 is database server 123 of FIG. 1. In some embodiments, network connection 209 is the connection in FIG. 1 connecting application server 121 to network 111.

In some embodiments, cloud service logic 203 implements cloud services that generate logging data. For example, one or more different components of a cloud service can generate log entries. In various embodiments, the log entries are available for review via a log analysis service implemented by cloud service logic 203. For example, a client can access a user interface implemented by cloud service logic 203 to explore generated log entries. The user can narrow down the log entries to identify a narrow set of entries tailored to a specific use case. In some embodiments, the entries are filtered down to a relevant set by applying one or more search filters. For example, a user can construct a search query and apply it to the log entries to narrow down results to a smaller filtered set of entries that match the search filter. In some embodiments, the search filter is implemented using a query language that applies operators to filter operands such as recommended filters. In various embodiments, the recommended filters are identified by log analysis engine 205. Log analysis engine 205 analyzes the log entries and identifies common portions that are used as recommended filters. When applied to a search filter, the common portions can be quickly matched (or unmatched) by selectively filtering the log entries corresponding to the common portions. The log entry lookups utilize an index constructed and updated by log analysis engine 205. In various embodiments, the index maps a recommended filter to the log entries that contain the associated common portion of the filter. For example, a recommended filters index includes for each common portion the references to the locations of the log entries that include of the corresponding common portion of the recommended filter.

In some embodiments, database server 207 is a database data store for storing customer data including log entries. For example, log analysis engine 205 can analyze the log entries generated by cloud service logic 203 by accessing the entries stored in database server 207. In various embodiments, log analysis engine 205 indexes the common portions identified in the log entries. The index may be stored on local storage of application server 201 and/or in a data store such as database server 207. In various embodiments, application server 201 is communicatively connected to database server 207. For example, cloud service logic 203 can write to and read from database server 207. Similarly, log analysis engine 205 of cloud service logic 203 can write to and read from database server 207, as required. In the example shown, database server 207 is shown as directly connected to application server 201, however, the connection is a logical connection. For example, database server 207 can exist on a different local network from application server 201.

Figure 3:
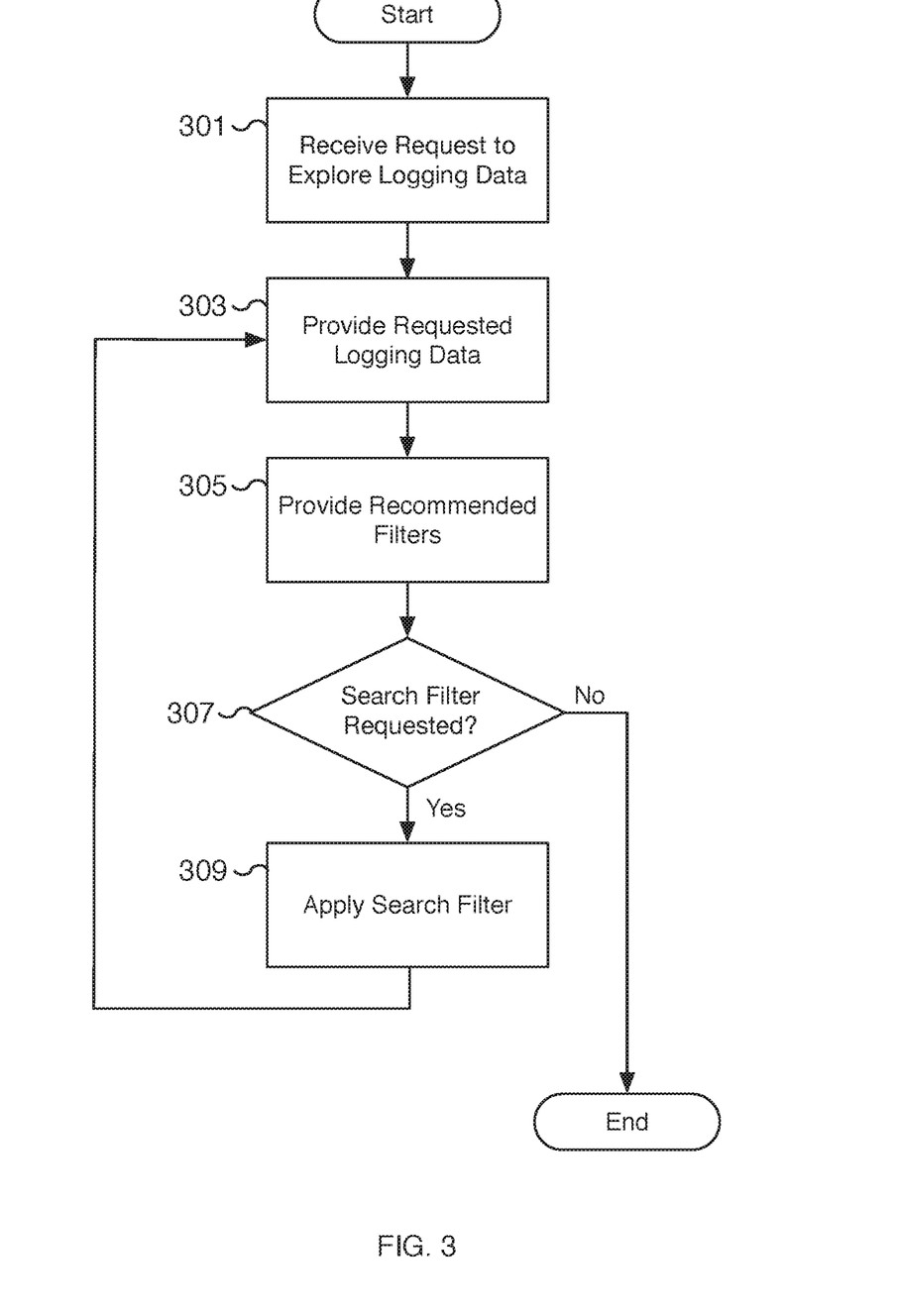
FIG. 3 is a flow chart illustrating an embodiment of a process for exploring logging data.

FIG. 3 is a flow chart illustrating an embodiment of a process for exploring logging data. Using the process of FIG. 3, a user can search log entries generated by an application such as a cloud service application. The log entries can be explored via a cloud service such as a log analysis service. As part of the exploration process, a user can iteratively search log entries to filter down the available log entries to a narrow set of relevant entries. In some embodiments, the log analysis service is hosted on application server 121 of FIG. 1 and/or application server 201 of FIG. 2. In some embodiments, the log analysis service is implemented by cloud service logic 203 using log analysis engine 205 of FIG. 2. In some embodiments, the logging data is stored on a database server such as database server 123 of FIG. 1 and/or database server 207 of FIG. 2.

At 301, a request to explore logging data is received. For example, a request is received by a user to explore logging data. The request may correspond to a request to explore the log entries corresponding to one or more components of a software service. In some embodiments, the request specifies a particular component such as a specific software and/or hardware component. In some embodiments, the request is bounded by a time span such as a start and end timestamp.

At 303, the requested logging data is provided. For example, the logging data matching a request is provided and can be displayed in a user interface. The request may correspond to a request to explore the log entries corresponding to one or more components of a software service received at 301. In various embodiments, the request is in response to a search filter such as the application of a recommended filter from step 309. The request may be in response to an iterative search where multiple search filters are applied in succession to iteratively narrow down the logging data to a narrow set of relevant log entries.

At 305, recommended filters are provided. For example, recommended filters corresponding to words and/or phrases identified in log entries are provided. The recommended filters can correspond to common portions of log entries identified by a log analysis engine such as log analysis engine 205 of FIG. 2. In some embodiments, the recommended filters are provided along with a distribution metric corresponding to how frequently the corresponding common portions appear in the logging data. The recommended filters can correspond to frequently occurring as well as infrequently occurring common portions. Users may want to filter-in or filter-out based on the recommended filters. By providing recommended filters, a user can quickly identify which filters are of interest and quickly narrow down the provided log entries to a narrow set of relevant log entries. For example, filtering-out using a commonly occurring recommended filter will remove many if not most of the log entries. Similarly, filtering-in using an infrequently occurring recommended filter will remove many if not most of the log entries. By selecting the appropriate recommended filter (s), a user can quickly filter the log entries to a narrow set of relevant log entries.

At 307, a determination is made whether a search filter is requested. For example, a user can request that a recommended filter is applied as a search filter. In the event a search filter is requested, processing proceeds to 309. In the event a search filter is not requested, processing completes.

At 309, a search filter is applied. For example, a determination is made that one or more recommended filters are requested as part of a search filter at 307 and the corresponding search filter is applied at 309. The recommended filters correspond to common portions identified in the log entries of the provided logging data. In various embodiments, the search filter includes a search operator such as Boolean operator applied to the common portion of the recommended filter. For example, a filter-in operation can apply a Boolean AND operation to the common portion of a recommended filter to match only log entries that include the common portion. Similarly, a filter-out operation can apply the Boolean AND NOT operations to the common portion of a recommended filter to match only log entries that do not include the common portion. In various embodiment, other operations other than filter-in and filter-out operations can be applied. For example, combinations of recommended filters can be applied. In some embodiments, the applied search filter utilizes a query language. In various embodiments, the search results determined by applying the search filter can be quickly determined by utilizing an index built using the recommended filters. The index allows for the rapid determination of which log entries a common portion can be found within allowing the search to quickly include or eliminate log entries from the search results.

Figure 4:
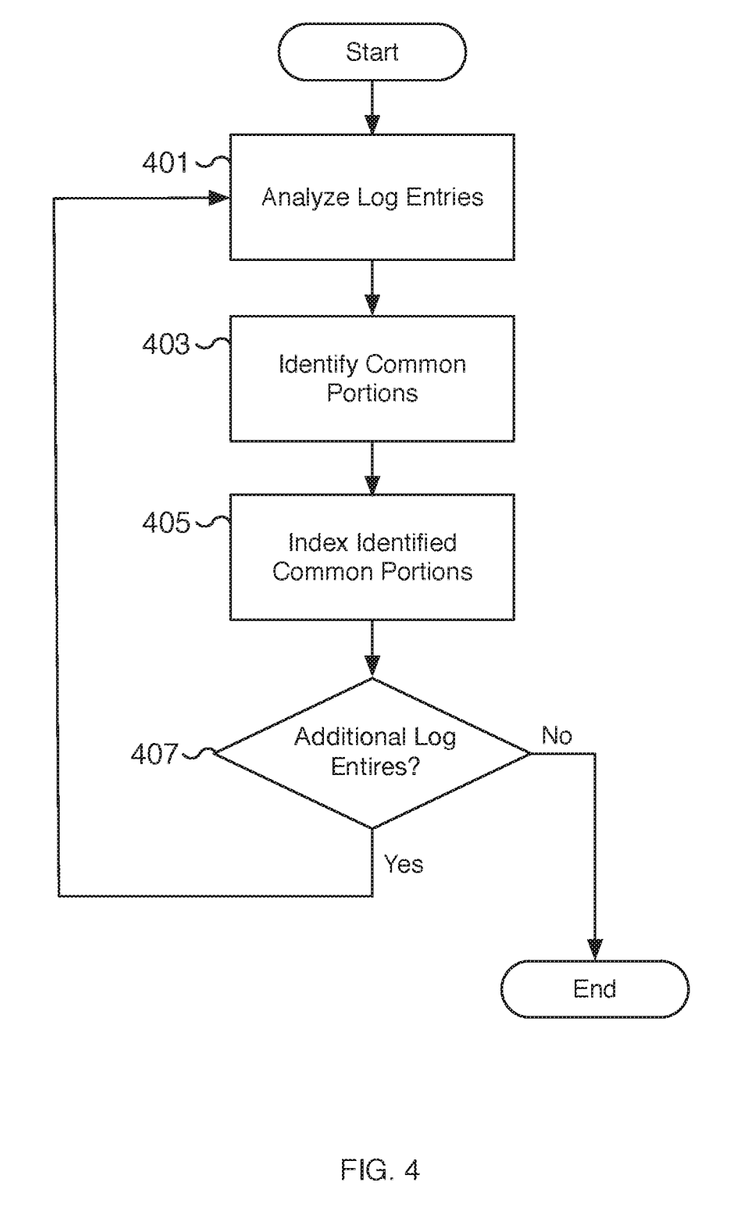
FIG. 4 is a flow chart illustrating an embodiment of a process for analyzing and indexing log entries.

FIG. 4 is a flow chart illustrating an embodiment of a process for analyzing and indexing log entries. Using the process of FIG. 4, log entries are analyzed to identify common portions and indexed by identified common portions to allow for the quick mapping and/or look up of a common portion to corresponding log entries. In various embodiments, the analysis can be performed on log entries of logs that have been previously generated and/or on a rolling basis as new log entries are recorded. In some embodiments, the process of FIG. 4 is performed at application server 121 of FIG. 1 and/or application server 201 of FIG. 2 by log analysis engine 205 of FIG. 2. In some embodiments, the log entries analyzed are stored on a database server such as database server 123 of FIG. 1 and/or database server 207 of FIG. 2. In some embodiments, the process of FIG. 4 is performed on log entries corresponding to the logging data requested at 301 of FIG. 3 and to provide the recommended filters at 305 of FIG. 3. The provided recommended filters allow a user to quickly narrow down the logging data to a narrow set of relevant log entries.

At 401, log entries are analyzed. The log entries are analyzed using machine learning techniques including natural language processing techniques. In some embodiments, the log entries are first analyzed to determine sectional parts such as a timestamp, component/owner, message type, message level, and message, as some example sectional parts. For example, each component of a cloud service can tag its log messages to identify the particular component as the source or owner of a log entry. Example components can include components for implementing functionality related to security functions, networking functions, database queries, and audit compliance functions, among others. In some embodiments, a message sectional part can be a variable (or fixed) length text field where the message is at the discretion of the component owner. A particular word and/or phrases that appear in a log entry, and in particular in the message sectional part of a log entry, may be repeated across multiple log entries.

At 403, common portions of the log entries are identified. For example, common portions of the log entries analyzed at 401 are automatically identified across the log entries. The common portions can include a word or phrase that is included in a log entry including in the message part of a log entry. In various embodiments, a distribution metric such as the frequency a common portion appears in the log entries is determined. Common portions that are both common and uncommon are identified. For example, a unique phrase as well as a frequently occurring phrase can both be identified as common portions. In some embodiments, the common portion is identified based on the part of speech of the common portion. For example, natural language processing can be utilized to identify helpful and key common portions within a log entry. In some embodiments, common string analysis techniques are used to identify common portions. In some embodiments, the identified common portion can be seeded by a developer, such as the developer of a component of the cloud service. In various embodiments, the seed can be expressed as a regular expression or text pattern.

In some embodiments, the automatically identified common portions are utilized as recommended filters or are further narrowed into recommended filters. For example, in some embodiments, only a subset of identified common portions is surfaced as recommended filters. In some embodiments, the recommended filters are identified based on the distribution metric of the common portion in the log entries. Common portions that exist in every or nearly every log entry may be removed from recommendation. In some embodiments, the recommended filters are based on common portions that appear in high frequency but not in every log entry or are based on common portions that are relatively unique. In some embodiments, recommended filters are based on past common portions and their use, such as how frequently a common portion was utilized in past search filters.

At 405, the identified common portions are indexed. In various embodiments, an index is created and/or updated based on the identified common portions. The index maps a common portion to the log entries and/or the location of the log entries that include the common portion. In some embodiments, the index is constructed by assigning a unique identifier such as a numeric identifier to each common portion. Using a numeric index allows for the rapid lookup of every log entry that includes a particular common portion by using the unique identifier of the common portion. In various embodiments, the index allows for O(1) lookups in text-based logging data. For example, a common portion corresponding to the text "ip_blacklist" is assigned a unique identifier. The index for the unique identifier corresponding to the text "ip_blacklist" includes a reference or pointer to every log entry with the text "ip_blacklist." The index can be utilized to quickly identify all log entries that include the text "ip_blacklist" instead of performing a complete text-based search on all logging data.

At 407, a determination is made whether there are additional log entries for analysis. In the event additional log entries exist for analysis, processing loops back to 401 to analyze the remaining log entries. In the event no additional log entries exist for analysis, processing completes. In some embodiments, in the event no additional log entries exist for analysis, the process waits (not shown) until a set of log entries are recorded before looping back to 401 to analyze the newly recorded log entries.

Figure 5:
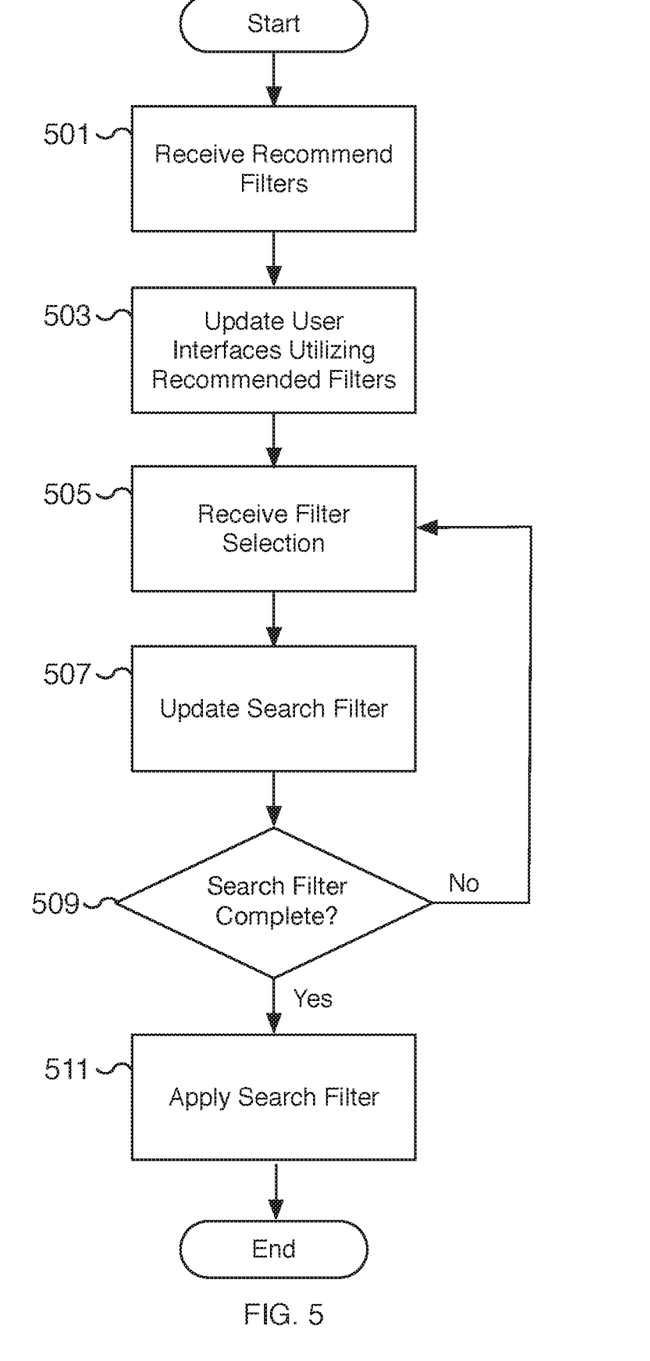
FIG. 5 is a flow chart illustrating an embodiment of a process for utilizing recommended filters to explore logging data.

FIG. 5 is a flow chart illustrating an embodiment of a process for utilizing recommended filters to explore logging data. Using the process of FIG. 5, a cloud-based log analysis service can provide a user the ability to explore and quickly identify relevant log entries within logging data. A user is presented with recommended filters based on an analysis of the relevant logging data. In some embodiments, the recommended filters are identified using the process of FIG. 4. A user can select from the recommended filters to create a search filter to identify a narrow set of relevant log entries. In some embodiments, the process of FIG. 5 is an iterative process. For example, the process of FIG. 5 may be performed multiple times in succession to successively and iteratively narrow down the filtered log entries until a final narrow set of the most relevant log entries is found. In some embodiments, the log analysis service is hosted on application server 121 of FIG. 1 and/or application server 201 of FIG. 2. In some embodiments, the log analysis service is implemented by cloud service logic 203 using log analysis engine 205 of FIG. 2. In some embodiments, the process of FIG. 5 is performed at 305, 307, and/or 309 of FIG. 3.

At 501, recommended filters are received. In some embodiments, the recommended filters each correspond to a common portion, such as a word or phrase, identified in one or more log entries. The recommended filters may each include a distribution metric related to how frequent a common portion of a recommended filter appears in the log entries. Common portions that exist in every or nearly every log entry may be removed from recommendation. In some embodiments, the recommended filters are based on common portions that appear in high frequency but not in every log entry or common portions that are relatively unique. In some embodiments, recommended filters are based on past common portions frequently utilized in past search filters. In various embodiments, the recommended filters are identified using the process of FIG. 4.

At 503, user interfaces utilizing the recommended filters are updated. For example, a user interface component that surfaces the recommended filters to a user for selection is updated to incorporate the recommendations received at 501. In various embodiments, a client accesses a user interface that presents the recommended filters. The recommended filters can be presented in a variety of methods. For example, in some embodiments, the relevant logging data is presented to the user. Depending on the number of log entries, only a portion of the log entries may be displayed at any given time. The recommended filters that appear within the displayed log entries can be identified, for example, by highlighting the relevant common portions. For example, the words or phrases of a message sectional part of a log entry that match the identified common portions of the recommended filters are highlighted. The highlighting of matches can be performed by a user interface element, such as a user interface element that underlines the matching common portions, changes the font and/or background of the matching common portions, and/or performs another appropriate technique to emphasize the matching common portions. In some embodiments, the presented recommended filters include associated search filter operators, such as filter-in and filter-out operators. The operators correspond to search operations that apply the common portion of the recommended filter using the appropriate search operator. The search operators may be displayed as user interface action components with different icons to represent different corresponding operations. For example, in some embodiments, the filter-in operator is represented by a magnifying glass icon with a plus sign and the filter-out operator is represented by a magnifying glass icon with a minus sign.

In various embodiments, the search filter operations may be displayed along with the common portion of a provided recommended filter and/or may only be displayed as detailed configuration options of the recommended filter. For example, the filter-in and filter-out operators may only be displayed when a user hovers over the highlighted matching common portion of a recommended filter in a displayed log entry. In the default state, only the highlighted matching common portions are displayed. In some embodiments, detailed configuration options are made non displayed by default and are only displayed in response to a user action such as a hover action directed to a user interface element of the corresponding recommended filter. Once the detailed configuration options are revealed, a user can configure the selection of the recommended filter, for example, to configure a filter-in or filter-out search query using the recommended filter. In various embodiments, the detailed configuration options can include additional operators other than filter-in and filter-out operators. In some embodiments, the detailed configuration options display distribution metrics.

In some embodiments, the user interface element presenting recommended filters is a recommended filters dialog that includes a sorted list of recommended filters. The filters can be sorted by a distribution metric, for example, by increasing or decreasing the order of frequency the common portion is found within log entries. The recommended filters can also include user interface action components with different icons to represent different corresponding search filter operations. In various embodiments, different user interface implementations allow a user to interact with the recommended filters in the manner best appropriate to the scenario.

At 505, a filter selection is received. For example, a filter selection specifying a common portion and a search operation, such as a filter-in, filter-out, or another search operation to apply using the common portion of the filter selection is received. In some embodiments, the filter selection is a custom search term instead of based on a recommended filter. For example, a custom search term provided by a user as a search filter can include a time span search requirement.

In various embodiments, the filter selection received is selected by a user via a user interface of the log analysis service. For example, a user can select a common portion from the displayed recommended filters and an appropriate search operation. In some embodiments, the user interface provides detailed configuration options that allow the user to select among available search operations, such as a filter-in or filter-out operation, to perform on the common portion of the recommended filter.

At 507, the search filter is updated. For example, the filter selection received at 505 is used to update the search filter used to perform a search query on the logging data. In some embodiments, the filter selection received is incorporated with previously selected filter selections to form a combined search filter. For example, two selected recommended filters can be combined to form a search filter that matches only log entries that include the common portions of both selected filters. As another example, two selected recommended filters can be combined to form a search filter that matches only log entries that include the common portion of the first selected recommended filter (filter-in) but not the common portion of the second selected recommended filter (filter-out). Other combinations including combinations of more than two selected recommended filters may be appropriate as well. In some embodiments, the combinations include search criteria not specified by a recommended filter. For example, a user can provide a custom search term to update the search filter such as a time span requirement. In various embodiments, the updated search filter can be used to perform a search query on the logging data where the search result is the filtered set of log entries that match the search filter requirements. In some embodiments, the search filter is formatted using a query language. In some embodiments, the search filter can include operations such as regular expression operations.

At 509, a determination is made whether the search filter is complete. For example, a search filter is complete when there are no more additional search filter selections. In the event the search filter is complete, processing proceeds to 511 where the search filter is applied. In the event the search filter is not complete, processing loops back to 505.

At 511, the search filter is applied. For example, the search filter constructed by selecting one or more recommended filters is applied. The recommended filters can each correspond to a common portion identified in the log entries and depending on the relevant search operands, may filter-out, filter-in, or apply another search operation to the corresponding log entries. In various embodiments, the search filter includes one or more search operators such as one or more Boolean operators applied to common portions of the selected recommended filters. In various embodiments, the search results determined by applying the search filter can be quickly determined by utilizing an index built using the recommended filters and their common portions to identify corresponding log entries. For example, the log entries are identified using the unique identifiers associated with the common portions of the selected recommended filters. The indexed locations of log entries for the recommended filters are retrieved using the unique identifier of each selected recommended filter. The index allows for the rapid determination of which log entries a common portion can be found within and allow the search to quickly include or eliminate log entries from the search results. In some embodiments, the resulting log entries are provided for display and for additional exploration/filtering by repeating the process of FIG. 5.

Figure 6:
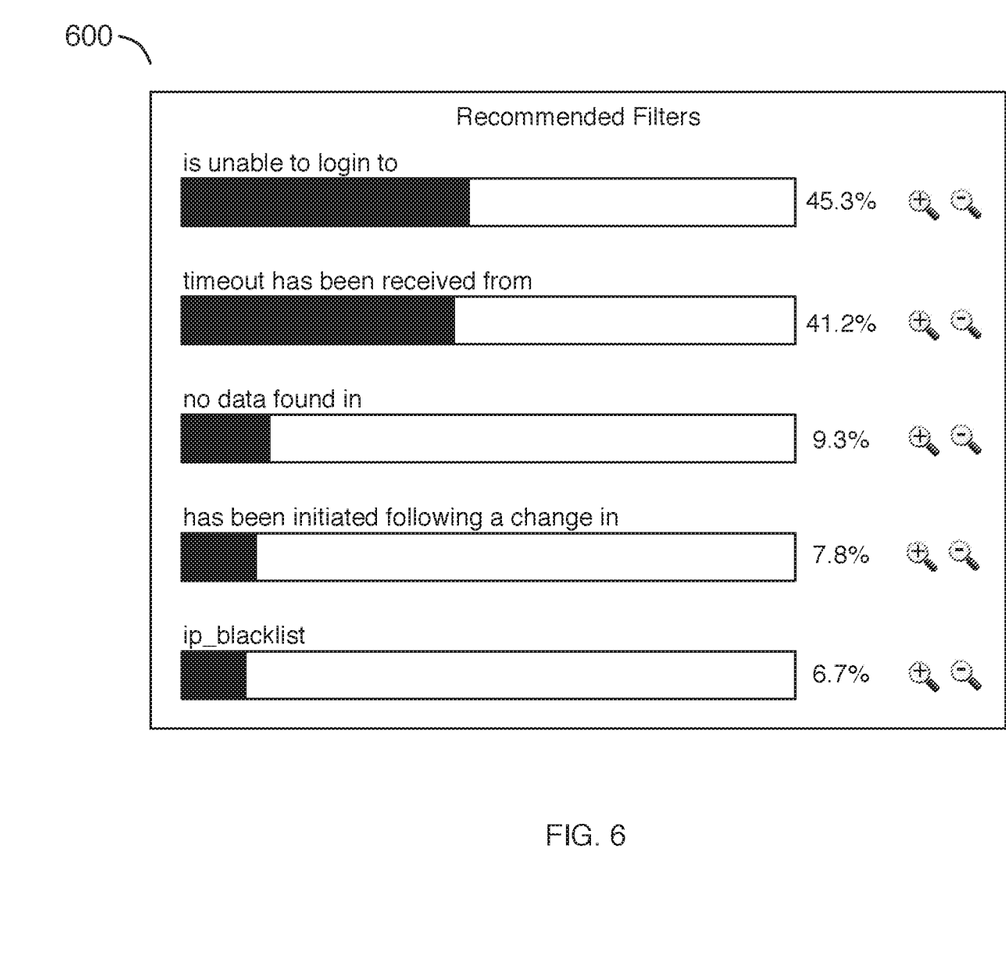
FIG. 6 is a diagram illustrating an example user interface implementing recommended filters identified from analyzing log search results.

FIG. 6 is a diagram illustrating an example user interface implementing recommended filters identified from analyzing log search results. In the example shown, user interface 600 includes a list of five recommended filters. Each recommended filter includes a common portion (such as a phrase or word) identified in at least one log entry. For example, the common portions of the displayed recommended filters include "is unable to login to," "timeout has been received from," "no data found in," "has been initiated following a change in," and "ip_blacklist." Each recommended filter includes a displayed numeric distribution metric such as 45.3% for "is unable to login to," 41.2% for "timeout has been received from," 9.3% for "no data found in," 7.8% for "has been initiated following a change in," and 6.7% for "ip_blacklist." In addition to the displayed numeric distribution metric, a visual representation of the metric is displayed under the common portion. In various embodiments, the distribution metric is associated with the frequency the identified common portion appears in the contents of the relevant log entries. In the example shown, the common portion "is unable to login to" appears in 45.3% of the relevant log entries whereas the common portion "no data found in" appears in 9.3% of the relevant log entries.

In the example of FIG. 6, for each recommended filter, user interface 600 includes user interface action components to the right of each displayed numeric distribution metric. The pair of user interface action components for each recommended filter represents filter operators corresponding to filter-in and filter-out operations. For example, the filter-in operator in FIG. 6 is represented by a magnifying glass icon with a plus sign and the filter-out operator is represented by a magnifying glass icon with a minus sign. In various embodiments, the filter-in and filter-out user interface action components can be used to perform search queries for the corresponding recommended filters. For example, in some embodiments, selecting the filter-in operator for the "is unable to login to" recommended filter will filter the relevant log entries to show only log entries that contain the common portion "is unable to login to" and selecting the filter-out operator for the "is unable to login to" recommended filter will filter the relevant log entries to remove all log entries that contain the common portion "is unable to login to." As an example, the log line "user john.doe is unable to login to surf due to: bad password" matches the filter-in operation for the "is unable to login to" recommended filter (emphasis added to show the matching common portion of the log entry). Although shown as variations of magnifying glass icons, other alternative icons may be appropriate as well for representing the filter-in and filter-out operations. Although each recommended filter is shown with the two filter-in and filter-out operations, in various embodiments, fewer or more filter operations can be included in user interface 600. The operators included can correspond to different Boolean operators, search query operators, and/or combinations of operators for applying the corresponding recommended filters.

In the example of FIG. 6, the list of five recommended filters and their corresponding common portions are examples. More or fewer filters may be recommended and the recommended filters may include different common portions than the examples, depending on the generated logging data. In some embodiments, the common portions are phrases instead of single words. The common portions can also include word stems. In some embodiments, the common portions include wild cards that allow the common portion to match to multiple different text strings.

In various embodiments, the recommended filters of user interface 600 are listed in an ordered sequence. In the example shown, the filters are shown by decreasing distribution metric. Other orderings such as by increasing distribution metric, most recently used, and most commonly used, etc. may be appropriate as well. In some embodiments, the recommended filters with a distribution metric among the most common and fewest are both shown. For example, recommended filters may include common portions with distribution metrics above 80% and those below 20%. As another example, common portions that are in all or nearly all log entries are displayed less prominently. For example, a common portion in 100% of log entries may not be helpful and is not prominently displayed, if displayed at all.

In some embodiments, user interface 600 of FIG. 6 is accessible by a client, such as one of clients 101, 103, or 105 of FIG. 1, via an application such as a web application running on application server 121 of FIG. 1 and/or application server 201 of FIG. 2. The application of user interface 600 can be implemented by cloud service logic 203 using log analysis engine 205 of FIG. 2. In some embodiments, user interface 600 is generated based on the processes of FIGS. 3-5.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a request to explore a set of log entries;
analyzing the set of log entries to identify common portions in contents of at least a portion of the set of log entries, including by determining distribution metrics of the common portions; and
based on the analysis that identified the common portions, automatically recommending filters to explore the set of log entries, including by using the determined distribution metrics to select the recommended filters, wherein the selected the recommended filters are determined to be associated ones of the common portions that meet frequency criteria but do not appear in every log entry of the set of log entries.

2. The method of claim 1, further comprising:
receiving a selection of one or more of the automatically recommended filters;
filtering the set of log entries using the one or more selected ones of the automatically recommended filters to determine a filtered set of log entries; and
providing the filtered set of log entries for display.

3. The method of claim 2, further comprising:
analyzing at least the filtered set of log entries to identify a second set of common portions in the contents of at least a portion of the filtered set of log entries; and
based on the analysis that identified the second set of common portions, automatically recommending a second set of filters to explore the filtered set of log entries.

4. The method of claim 1, comprising:
displaying a subset of the set of log entries;
identifying one or more of the automatically recommended filters applicable to the displayed subset of the set of log entries; and
for each of the one or more automatically recommended filters identified applicable to the displayed subset of the set of log entries, providing a user interface element for selecting the associated identified automatically recommended filter.

5. The method of claim 4, wherein the user interface element for selecting the associated identified automatically recommended filter includes a filter-in operation and a filter-out operation.

6. The method of claim 4, further comprising:
receiving a user action to the user interface element for selecting the associated identified automatically recommended filter; and
creating a search filter using the selected associated identified automatically recommended filter.

7. The method of claim 6, further comprising:
applying a search filter operator associated with the selected associated identified automatically recommended filter to the created search filter.

8. The method of claim 6, wherein the created search filter is a regular expression.

9. The method of claim 4, further comprising:
receiving a hover action directed to one of the provided user interface elements for selecting the associated identified automatically recommended filter; and
displaying detailed configuration options associated with the one of the provided user interface elements in response to the directed hover action.

10. The method of claim 1, further comprising:
assigning for each of the identified common portions a unique identifier; and
indexing each of the identified common portions by the assigned unique identifier.

11. The method of claim 10, wherein a result of the indexing includes references to locations of the identified common portions in the set of log entries.

12. The method of claim 11, further comprising:
receiving a selection of one or more of the automatically recommended filters; and
for each of the selected one or more of the automatically recommended filters:
identifying an associated common portion for the selected automatically recommended filter; and
searching the set of log entries using the assigned unique identifier associated with the identified associated common portion.

13. The method of claim 12, wherein searching the set of log entries using the assigned unique identifier associated with the identified associated common portion includes retrieving a subset of the references to locations of the identified common portions in the set of log entries.

14. The method of claim 1, further comprising:
displaying a user interface component that includes one or more of the identified common portions associated with one or more of the automatically recommended filters; and
for each of the included identified common portions, displaying a distribution metric associated with a frequency of the included identified common portion in the contents of the set of log entries.

15. The method of claim 14, wherein the one or more included identified common portions are sorted by the associated distribution metrics.

16. A computer program product, the computer program product comprising a non-transitory computer readable storage medium storing computer instructions which when executed cause one or more processors to:
receive a request to explore a set of log entries;

analyze the set of log entries to identify common portions in contents of at least a portion of the set of log entries, including by determining distribution metrics of the common portions; and based on the analysis that identified the common portions, automatically recommend filters to explore the set of log entries, including by using the determined distribution metrics to select the recommended filters, wherein the selected the recommended filters are determined to be associated ones of the common portions that meet frequency criteria but do not appear in every log entry of the set of log entries.

17. The computer program product of claim 16, wherein the computer instructions when executed further cause the one or more processors to:

receive a selection of one or more of the automatically recommended filters;

filter the set of log entries using the one or more selected ones of the automatically recommended filters to determine a filtered set of log entries; and provide the filtered set of log entries for display.

18. The computer program product of claim 17, wherein the computer instructions when executed further cause the one or more processors to:

analyze at least the filtered set of log entries to identify a second set of common portions in the contents of at least a portion of the filtered set of log entries; and based on the analysis that identified the second set of common portions, automatically recommend a second set of filters to explore the filtered set of log entries.

19. A system, comprising:

one or more processors; and a memory coupled to the one or more processors, wherein the memory is configured to provide the one or more processors with instructions which when executed cause the one or more processors to:

receive a request to explore a set of log entries;

analyze the set of log entries to identify common portions in contents of at least a portion of the set of log entries, including by determining distribution metrics of the common portions; and based on the analysis that identified the common portions, automatically recommend filters to explore the set of log entries, including by using the determined distribution metrics to select the recommended filters, wherein the selected the recommended filters are determined to be associated ones of the common portions that meet frequency criteria but do not appear in every log entry of the set of log entries.

20. The system of claim 19, wherein the memory is further configured to provide the one or more processors with additional instructions which when executed cause the one or more processors to:

receive a selection of one or more of the automatically recommended filters;

filter the set of log entries using the one or more selected ones of the automatically recommended filters to determine a filtered set of log entries; and provide the filtered set of log entries for display.

* * * * *